United States Patent
Bates

(10) Patent No.: US 10,452,248 B2
(45) Date of Patent: *Oct. 22, 2019

(54) LOCK SCREEN MEDIA PLAYBACK CONTROL

(71) Applicant: Sonos, Inc., Santa Barbara, CA (US)

(72) Inventor: Paul Andrew Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 15/341,740

(22) Filed: Nov. 2, 2016

(65) Prior Publication Data

US 2017/0060402 A1    Mar. 2, 2017

Related U.S. Application Data

(63) Continuation of application No. 14/320,981, filed on Jul. 1, 2014, now Pat. No. 9,519,413.

(51) Int. Cl.
| | |
|---|---|
| *G06F 3/048* | (2013.01) |
| *G06F 3/0484* | (2013.01) |
| *G06F 3/0481* | (2013.01) |
| *G06F 3/0488* | (2013.01) |
| *G06F 3/0482* | (2013.01) |
| *G06F 3/16* | (2006.01) |

(52) U.S. Cl.
CPC ........ *G06F 3/04847* (2013.01); *G06F 3/0482* (2013.01); *G06F 3/0484* (2013.01); *G06F 3/0488* (2013.01); *G06F 3/04817* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |

(Continued)

FOREIGN PATENT DOCUMENTS

| | | |
|---|---|---|
| EP | 1389853 A1 | 2/2004 |
| EP | 2704407 A1 | 3/2014 |

(Continued)

OTHER PUBLICATIONS

"AudioTron Quick Start Guide, Version 1.0", Voyetra Turtle Beach, Inc., Mar. 2001, 24 pages.

(Continued)

*Primary Examiner* — Thanh T Vu
(74) *Attorney, Agent, or Firm* — McDonnell Boehnen Hulbert & Berghoff LLP

(57) ABSTRACT

Embodiments are provided for providing on a display of a computing device, playback controls for a particular playback zone of a media playback system, while the computing device is in a locked state. The playback controls may then be selected to control playback of media content in the playback zone, while the computing device remains in the locked state.

20 Claims, 6 Drawing Sheets

(56) References Cited

U.S. PATENT DOCUMENTS

| | | | |
|---|---|---|---|
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,590,772 | B2 | 9/2009 | Marriott et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,291,349 | B1 | 10/2012 | Park et al. |
| 8,483,853 | B1 | 7/2013 | Lambourne |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0089529 | A1 | 7/2002 | Robbin |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2004/0175159 | A1 | 9/2004 | Oetzel et al. |
| 2006/0008256 | A1 | 1/2006 | Khedouri et al. |
| 2006/0026521 | A1 | 2/2006 | Hotelling et al. |
| 2006/0195480 | A1 | 8/2006 | Spiegelman et al. |
| 2006/0225097 | A1 | 10/2006 | Lawrence-Apfelbaum |
| 2007/0079340 | A1* | 4/2007 | McEnroe ............... H04N 7/163 725/78 |
| 2007/0142944 | A1 | 6/2007 | Goldberg et al. |
| 2007/0150830 | A1 | 6/2007 | Ording et al. |
| 2009/0061837 | A1* | 3/2009 | Chaudhri ............... G06F 3/0481 455/418 |
| 2011/0126116 | A1* | 5/2011 | Lee ........................ G08C 17/00 715/739 |
| 2011/0163972 | A1 | 7/2011 | Anzures et al. |
| 2013/0211843 | A1 | 8/2013 | Clarkson |
| 2013/0298024 | A1 | 11/2013 | Rhee et al. |
| 2014/0181659 | A1 | 6/2014 | Kumar |
| 2014/0362293 | A1* | 12/2014 | Bakar .................. H04N 5/4401 348/552 |
| 2015/0078586 | A1 | 3/2015 | Ang et al. |

FOREIGN PATENT DOCUMENTS

| | | |
|---|---|---|
| WO | 200153994 | 7/2001 |
| WO | 2003093950 A2 | 11/2003 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

First Action Interview Office Action dated Jun. 10, 2016, issued in connection with U.S. Appl. No. 14/320,981, filed Jul. 1, 2014, 7 pages.

International Searching Authority, International Search Report and Written Opinion dated Sep. 25, 2015, issued in connection with International Application No. PCT/US2015/038808, filed on Jul. 1, 2015, 13 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Notice of Allowance dated Oct. 19, 2016, issued in connection with U.S. Appl. No. 14/320,981, filed Jul. 1, 2014, 7 pages.

Palm, Inc., "Handbook for the Palm VII Handheld," May 2000, 311 pages.

Preinterview First Office Action dated Apr. 11, 2016, issued in connection with U.S. Appl. No. 14/320,981, filed Jul. 1, 2014, 5 pages.

Presentations at WinHEC 2000, May 2000, 138 pages.

UPnP; "Universal Plug and Play Device Architecture," Jun. 8, 2000; version 1.0; Microsoft Corporation; pp. 1-54.

"Denon 2003-2004 Product Catalog," Denon, 2003-2004, 44 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Searching Authority, International Preliminary Report on Patentability dated Jan. 12, 2017, issued in connection with International Application No. PCT/US2015/038808, filed on Jul. 1, 2015, 10 pages.

European Patent Office, European Extended Search Report dated Sep. 11, 2017, issued in connection with EP Application No. 15814014.5, 11 pages.

Nordvaller, Peter. "Sonomote Volume Control," Apr. 17, 2014, 2 pages.

Sorensen et al. "The Cognitive Perception of a Multi-room Music System with Spatial Interaction" Nov. 25, 2013, Network and Parallel Computing 25th Australian Computer-Human Interaction Conference, 23 pages.

* cited by examiner

LOCK SCREEN MEDIA PLAYBACK CONTROL

CROSS REFERENCE TO RELATED APPLICATIONS

This application is a continuation of U.S. non-provisional patent application Ser. No. 14/320,981, filed on Jul. 1, 2014, entitled "Lock Screen Media Playback Control," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
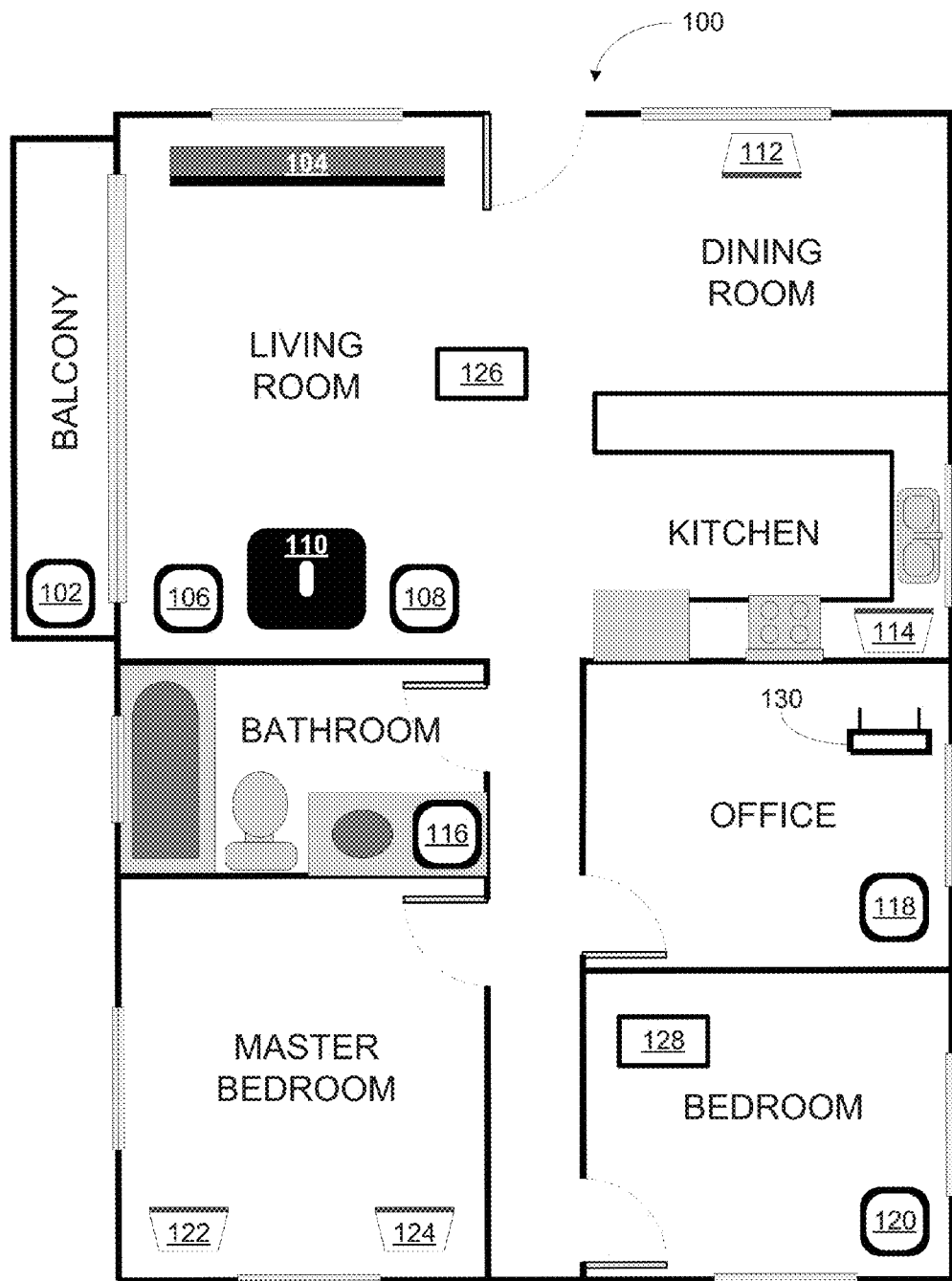
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A computing device, such as a mobile device, may have installed thereon a controller application to provide a controller interface on the mobile device for a media playback system. In some cases, the mobile device may enter a locked state within which certain data and functions of the mobile device are not accessible. As such, the locked state may protect personal or confidential information stored on the mobile device. To access the certain data and functions, the mobile device must first be unlocked, via entering a passcode and/or providing some other type of credential.

In one example, controlling playback of media content in a particular playback zone via the mobile device while the mobile device is in a locked state may involve one or more of an unlocking of the mobile device, a selection of the controller application, and a navigation to the particular playback zone within the controller interface provided by the controller application, among others.

Some examples described herein involve providing on a display of a computing device, while the computing device is in a locked state, playback controls for a particular playback zone of a media playback system, more of which is described below. The playback controls may be used to control playback of media content in the particular playback zone, while the computing device remains in the locked state.

In one example, while the computing device is in the locked state, a graphical display of the computing device may display an indication of a playback zone and control elements selectable for controlling media playback in the playback zone of a media playback system. An interface provided on the graphical display of the computing device while the computing device is in a locked state may referred to as a lock screen. The control elements may include control elements selectable to, among other things, cause media content to be played, paused, skipped forward, and/or skipped backward, among others. The control elements may also include control elements to modify a playback volume in the playback zone. As such, the control elements are selectable even while the computing device is in a locked state to cause the playback zone to change playback states.

In one case, the playback zone for which the control elements are displayed may be a playback zone that was last accessed using the computing device, a playback zone that the computing device determines is nearest to the computing device, or a predetermined default zone that is displayed when the computing device establishes communication with the media playback system. Other examples are also possible.

While still in the locked state, a selection of one or more of the control elements may be received via the computing device. Based on the one or more control elements selected, the computing device causes a particular playback zone to go from a first playback state to a second playback state. For instance, if the playback zone is in a paused playback state, a selection of a control element to play media content in the playback zone will cause the playback zone to begin playing media content, or continue playing media content that was previously paused. Other examples are also possible.

In one example, the graphical display may also display a control element for unlocking the computing device when the computing device is in the locked state. In one case, the computing device may, in response to a selection of the control element for unlocking the computing device, cause the computing device to enter an unlocked state, and cause the graphical display to display a controller interface for the media playback system. Upon entering the unlocked state, the controller interface may automatically display information and control options for the playback zone indicated on the lock screen before the computing device entered the unlocked state. In other words, no additional navigation within the computing device and the controller interface is needed to access the particular playback zone when accessing the controller interface via the selection of the control element for unlocking the computing device. Other examples are also possible.

As indicated above, the examples provided herein involve displaying on a graphical display of a computing device in a locked state, an indication of a playback zone and at least one control element that is selectable to control a playback state of the playback zone. In one aspect, a method is provided. The method involves, while (i) a computing device is in a locked state and (ii) a playback zone of a media playback system is in a first playback state, causing, by the computing device, a graphical display to display an indication of the playback zone and at least one control element. The at least one control element controls the playback state of the playback zone. The method further involves, while the computing device is in the locked state, receiving by the computing device a selection of one or more of the at least one control element, and while the computing device is in the locked state, based on the received selection, the computing device causing the playback zone to enter a second playback state.

In another aspect, a computing device is provided. The computing device includes a processor, and memory having stored thereon instructions executable by the processor to cause the computing device to perform functions. The functions include, while (i) the computing device is in a locked state and (ii) a playback zone of a media playback system is in a first playback state, causing a graphical display to display an indication of the playback zone and at least one control element. The at least one control element controls the playback state of the playback zone. The functions also include, while the computing device is in the locked state, receiving by the computing device a selection of one or more of the at least one control element, and while the computing device is in the locked state, based on the received selection, causing the playback zone to enter a second playback state.

In yet another aspect, a non-transitory computer readable memory is provided. The non-transitory computer readable memory has stored thereon instructions executable by a computing device to cause the computing device to perform functions. The functions include, while (i) a computing device is in a locked state and (ii) a playback zone of a media playback system is in a first playback state, causing a graphical display to display an indication of the playback zone and at least one control element. The at least one control element controls the playback state of the playback zone. The functions also include, while the computing device is in the locked state, receiving a selection of one or more of the at least one control element, and while the computing device is in the locked state, based on the received selection, causing the playback zone to enter a second playback state.

While some examples described herein may refer to functions performed by given actors such as "users" and/or other entities, it should be understood that this is for purposes of explanation only. The claims should not be interpreted to require action by any such example actor unless explicitly required by the language of the claims themselves.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
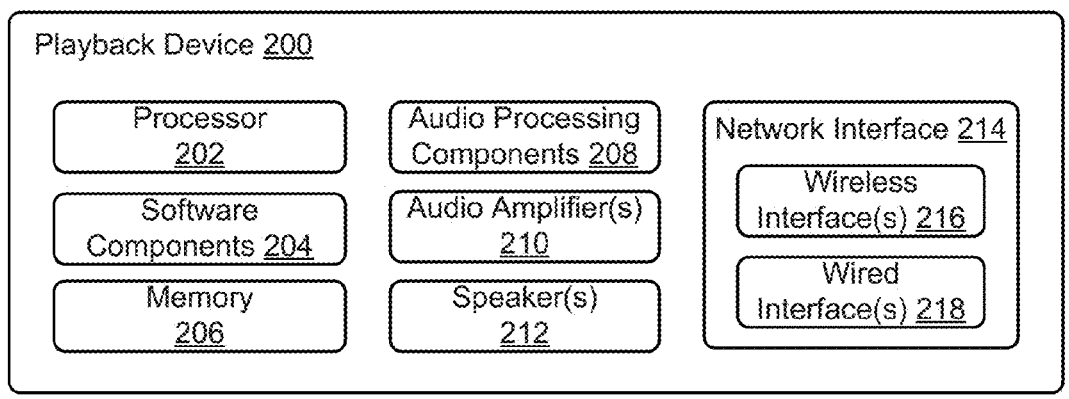
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
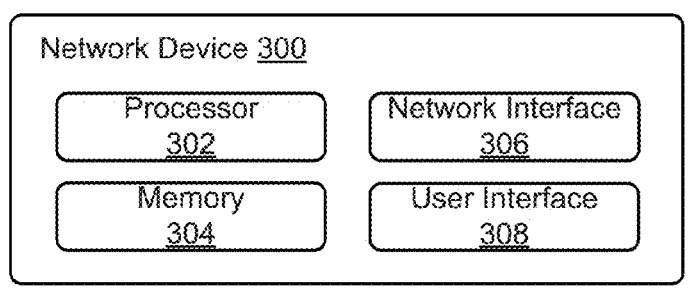
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
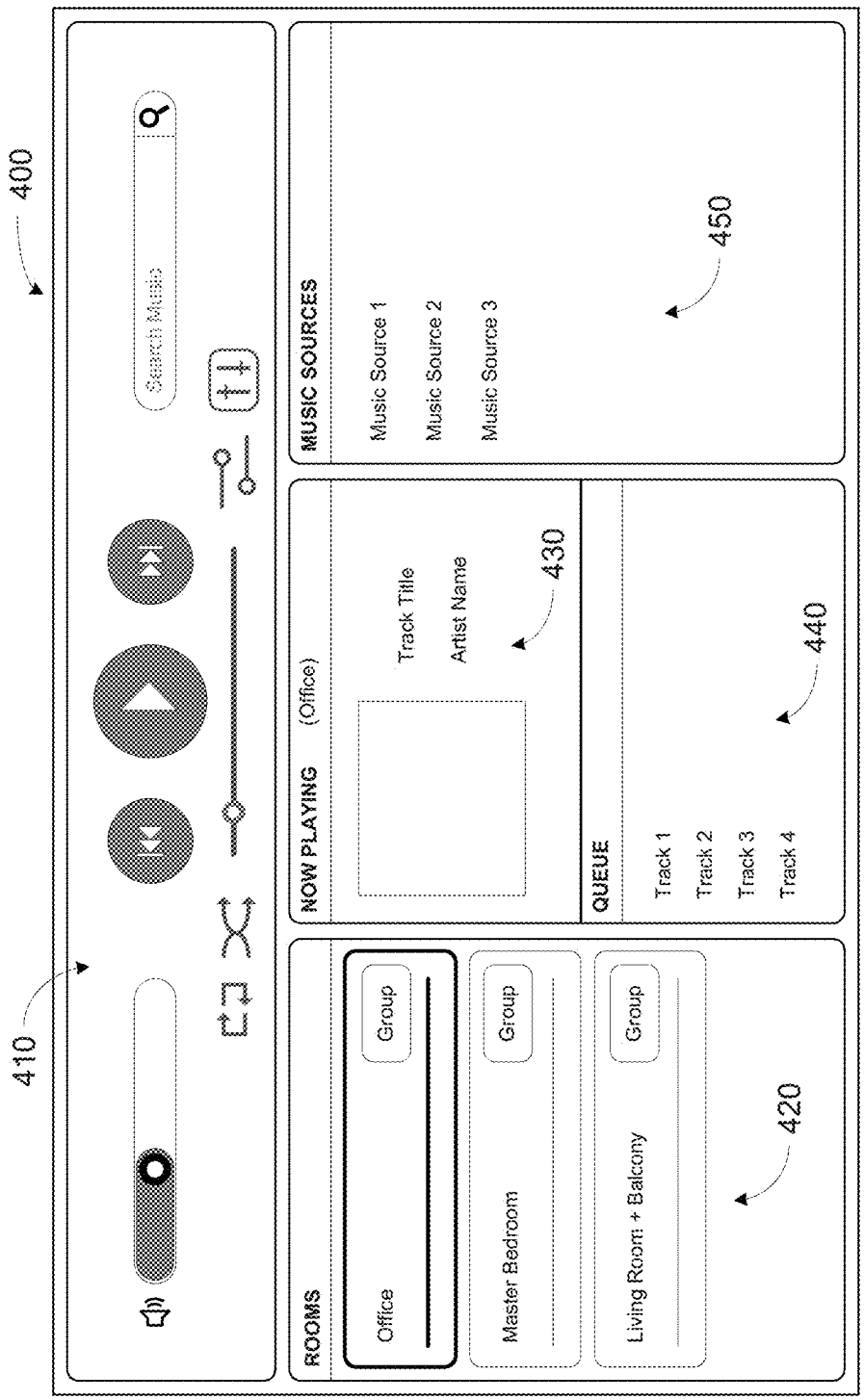
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Lock Screen Media Playback Control

As discussed above, some examples described herein involve providing on a display of a computing device, playback controls for a playback zone of a media playback system, while the computing device is in a locked state. The playback controls may be selected to control playback of media content in the playback zone, while the computing device remains in the locked state. These examples may allow playback of media content in the playback zone to be quickly controlled via a lock screen of the computing device, without having to unlock the computing device, open a controller application that provides a controller interface for the media playback system, and navigate to the particular playback zone within the controller interface.

Figure 5:
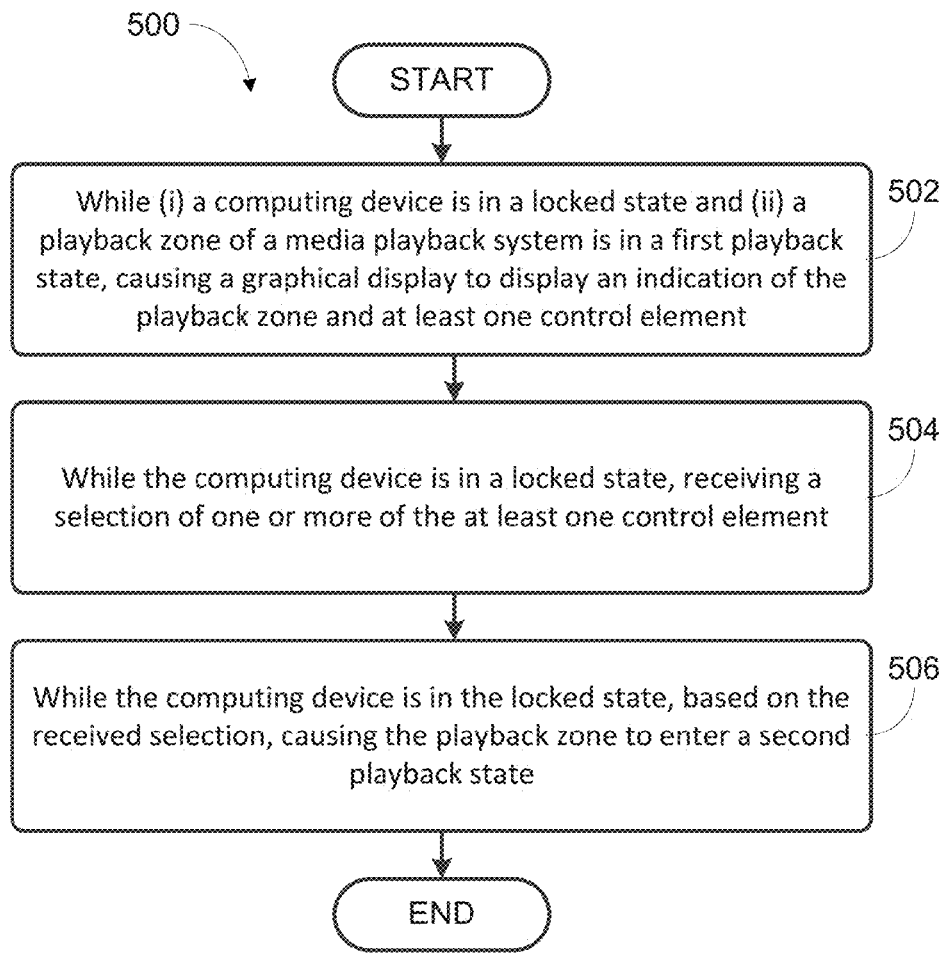
FIG. 5 shows an example flow diagram for controlling media playback in a playback zone based on selections of control elements received via a computing device in a locked state.

FIG. 5 shows an example method 500 of such an embodiment. Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of a possible implementation. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

As shown in FIG. 5, the method 500 involves causing a graphical display to display an indication of the playback zone and at least one control element at block 502, receiving a selection of one or more of the at least one control element at block 504, and based on the received selection, causing the playback zone to enter a second playback state at block 506. The method 500 may be performed by a computing device while in a locked state. In one example, the computing device may be a device like the control device 300 described above in connection to FIG. 3.

a. Causing a Graphical Display to Display an Indication of a Playback Zone and at Least One Control Element At block 502, the method 500 involves, while (i) a computing device is in a locked state and (ii) a playback zone of a media playback system is in a first playback state, causing a graphical display to display an indication of the playback zone and at least one control element. In one example, the graphical display may also display an indication of the first playback state.

In one example, the graphical display may be a graphical display that is embedded in the computing device. For instance, if the computing device is a mobile device, the graphical display may be the graphical display on the mobile device. In another example, the graphical display may be a graphical display that is connected to the computing device. For instance, if the computing device is a personal computer, the graphical display may be a computer display. Other examples are also possible.

In one example, the locked state of the computing device may be a security measure to protect access to the computing device by unauthorized users. In one case, the computing device may enter the locked state if no user interaction with the computing device occurs for a predetermined duration of time. In another case, the computing device may enter the locked state in response to a command to enter the locked state.

As indicated above, while in a locked state, the interface provided on the graphical display may be referred to as a lock screen. When attempting to access the computing device while the computing device is in a locked state, the lock screen may prompt the user to provide security credentials. The security credentials may include one or more of a alphanumerical password, a personal identification number (PIN), fingerprint identification, or geometric pattern, among others. In some cases, the computing device may be accessed using multiple user profiles or user accounts. The different user profiles or user accounts may each have a respective security credential for accessing the computing device. In some other cases, the computing device may be accessed using a single user profile or account, using a single security credential.

In one example, the computing device may have no functionality while in a locked state, aside from mechanisms for the user to provide the security credentials and cause the computing device to enter the unlocked state. In another example, the computing device may have limited functionality while in a locked state. For instance, if the computing device is a mobile phone, a user of the computing device may be capable of receiving and answering a phone call, but may not be able to place any calls while the computing device is in a locked state. In another instance, if the computing device is a camera device, the user of the computing device may be able to capture photographs, but may not view any previously captured photographs while the computing device is in a locked state. Other examples are also possible.

As indicated previously, the media playback system may include multiple playback zones. In one example, the playback zone indicated on the graphical display and with which the at least one control element is associated may be a playback zone that was last accessed via the computing device.

In another example, the playback zone indicated on the graphical display may be a playback zone that is currently playing media content, and/or a playback zone that the computing device is physically closest too. In one case, the computing device may determine which playback zone the computing device is physically closest too according to wireless communication signal strengths and/or local area network triangulation.

In a further example, a default playback zone may be displayed on the graphical display. For instance, a "Living Room" zone may be the playback zone that is indicated on the graphical display when the computing device establishes communication with the media playback system.

In yet another example, some combination of the above examples may be implemented. For instance, the default playback zone, or the last access playback zone may be indicated on the graphical display unless there is a playback zone currently playing media content, in which case the playback zone that is currently playing media content will be indicated on the graphical display. Other examples are also possible.

In one example, the first playback state of the playback zone may generally be one of a playing state, or a paused state. In another example, the first playback state of the playback zone may be associated with a media item that is being played or paused in the playback zone, and accordingly discernable by the media item. For instance, the playback zone may be in the first playback state when playing a first media item, and in another playback state when playing a second media item. Other examples are also possible.

In one example, the computing device may receive data indicating the first playback state of the playback zone. For instance, when the playback zone enters the first playback state, one or more devices in the media playback system may transmit data indicating that the playback zone is in the first playback state, and the computing device may receive the transmitted data. Based on the received data, the computing device may then display on the graphical display, information indicating the first playback state of the playback zone, and the at least one control element.

In one example, the data may be received by the computing device via a software application being executed on the computing device to allow the computing device to interface with the media playback system. In one case, the software application may relay the data, or a portion of the data to the lock screen interface of the computing device. In one instance, the software application may relay any data associated with controlling playback in the playback zone to the lock screen interface. In another instance, the lock screen interface of the computing device may request data from the software application, and the software application may responsively provide the requested data. Other examples are also possible.

The at least one control element may be selectable to control the playback state of the playback zone. The at least one control element displayed may include one or more of (a) a play control element, (b) a pause control element, (c) a skip forward control element, (d) a skip backward control element, and (e) a volume adjustment control element.

In one example, a selection of the play control element may cause the playback zone to begin playing media content in a playback queue associated with the playback zone. In another example, a selection of the skip forward control element may cause the playback zone to begin playing media content that is next in the playback queue. In a further example, a selection of the skip backward control element may cause the playback zone to begin playing a previous media content in the playback queue, or begin playing the media content from the beginning. Other examples are also possible.

In some cases, the at least one control element may also include a playback zone selection control element, a playback zone group configuration control element, and/or a playback queue browsing control element. In connection to the media playback system discussed above, the playback zone selection control element may be selectable to switch to view information and control elements applicable to a different playback zone in the media playback. The playback zone group configuration control element may be selectable to modify a zone configuration within the media playback system, and the playback queue browsing control element may be selectable to view media items in a playback queue associated with the playback zone. As indicated above, the computing device may have limited functionality while in the locked state. In this case, the at least one control element displayed may include control elements associated with functionalities available via the computing device while the computing device is in the locked state. Other examples are also possible.

Figure 6:
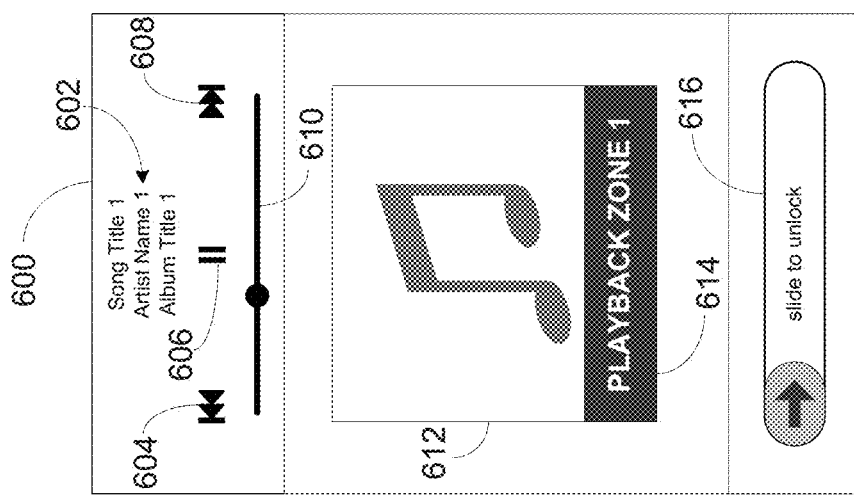
FIG. 6 shows an example computing device interface displaying playback controls for a playback zone of a media playback system, while the computing device is in a locked state.

FIG. 6 shows an example computing device interface 600 displaying playback controls for a playback zone named "Playback Zone 1" that is currently playing a media item. As shown, the interface 600 includes a skip backward control element 604 selectable to cause Playback Zone 1 skip to the beginning of the media content, or in some cases, skip to a previous media item. The interface 600 also includes a pause control element 606 selectable to cause playback of the media content being played in Playback Zone 1 to be paused, and a skip forward control element selectable to cause Playback Zone 1 to skip to a next media item. The interface further also includes a progress bar 610 indicating a playback progress of the media item in Playback Zone 1. In one case, the progress bar 610 may also be selectable to change the playback progress of the media item.

The interface 600 may also include information indicating the media item being played in Playback Zone 1. As shown, metadata 602 may identify the media item as "Song Title 1" by artists "Artist Name 1" from the album "Album Title 1." Album art 612 may be an album art for Album Title 1. The interface 600 may further include a playback zone indication 614 identifying Playback Zone 1 as the playback zone the control elements and information displayed are associated with. Other examples are also possible.

As indicated above, the computing device providing the interface 600 may be in a locked state. Accordingly, the interface 600 may be a lock screen of the computing device and may include a control element 616 for unlocking the computing device. As shown, the control element 616 indicates "slide to unlock" as a means to unlock the computing device.

In one example, if the computing device has a built-in music player, the computing device may have a native interface to allow control of media playback by the computing device. The built-in music player may be used to play media content stored on the computing device, and the native interface may be used to control playback of the media content played by the built-in music player. In one case, the native interface may include native lock screen control elements for controlling media playback directly from a lock screen of the computing device.

In one example, the control elements and information associated with the playback zone that are provided on the lock screen of the computing device may be based on the native interface of the computing device. In one case, a controller application for controlling the media playback system may communicate and interface with the native interface such that native lock screen control elements may be associated with corresponding control functions of the controller application. For instance, a native lock screen control element for playing media content may be associated with a function for playing media content using the media playback system. Other examples are also possible.

In some cases, the native interface may not include or allocate space for an indication of the playback zone because the built-in music player does not have multi-zone playback capabilities. In one case, indication of the playback zone may be overlaid over artwork associated with the media item played in the playback zone (i.e. album art), and a modified album art may be provided as album art for the built-in interface to display. As shown, the playback zone indicator 614 may be overlaid the album art 612 associated with the media item played in Playback Zone 1. In another example, metadata indicating the artist name, album name, or song title may be modified to indicate the playback zone. For instance, the artist name may be modified from "Artist Name 1" to "Artist Name 1—Playback Zone 1." Other examples are also possible.

b. Receiving a Selection of One or More of the at Least One Control Element

At block 504 in FIG. 5, the method 500 involves while the computing device is in the locked state, receiving a selection of one or more of the at least one control element. In one example, if the graphical display of the computing device has a touch-sensitive screen, the selection of the one or more of the at least one control element may be received via a touch input on the graphical display. In another example, if the computing device is a personal computer and the graphical display is a computer display, the selection of the one or more of the at least one control element may be received via a pointing device (i.e. computer mouse). Other examples are also possible.

As indicated above, the at least one control element may be based on a native lock screen control elements for the computing device. In such a case, the selection of one or more of the at least one control element may be received via a native interface of the computing device. The selection may then be communicated, internally within the computing device, from the native interface of the computing device to the controller application for the media playback system.

c. Causing the Playback Zone to Enter a Second Playback State

At block 506, the method 500 involves while the computing device is in the locked state, based on the received selection, causing the playback zone to enter a second playback state. Referring back to FIG. 6, if the pause control element 606 is selected, the computing device may cause Playback Zone 1 to enter a second playback state that is a paused state. In one case, causing Playback Zone 1 to enter the paused state may involve the computing device sending a transmission to one or more devices in the media playback system indicating that Playback Zone 1 is to enter a paused state. In one instance, the one or more devices in the media playback system may include one or more playback devices in Playback Zone 1.

Upon Playback Zone 1 entering the paused state, the interface 600 may be updated to reflect the updated playback state of Playback Zone 1. In the case the at least one control element discussed in connection to block 504 is based on a native interface of the computing device, the controller application on the computing device may communicate the updated playback state to the native interface, such that the lock screen can be updated to display a native lock screen control element that reflects the updated playback state.

Figure 7A:
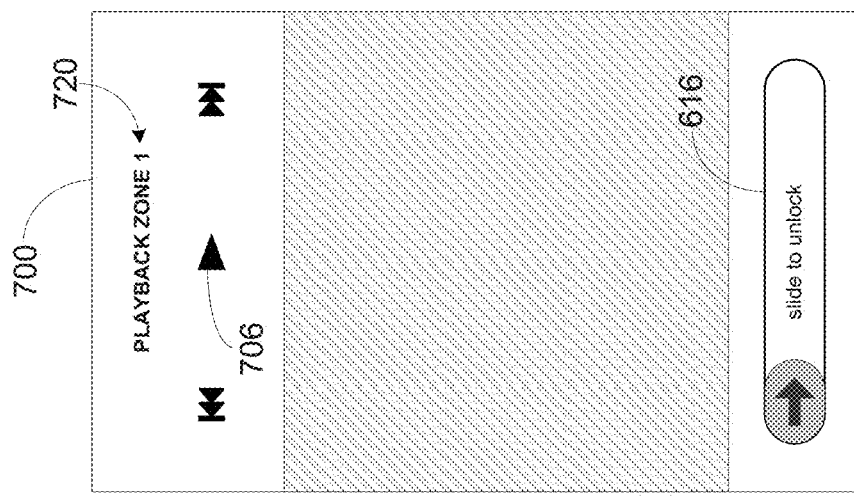
FIGS. 7A, 7B, and 7C show a series of illustrative example computing device interfaces for controlling media playback in a playback zone.

FIG. 7A shows a first example computing device interface 700 that may be displayed in response to Playback Zone 1 entering the paused state. As shown, interface 700 includes some similar control elements to that of interface 600, such as the skip backward control element 604, skip forward control element 606, and the progress bar 610. Instead of the pause control element 606, the interface 700 displays a play control element 706. Further, instead of metadata 602, an playback zone indication 720 may be provided identifying the displayed control elements are applicable to Playback Zone 1. In addition, in this example, album art 614 is not displayed. Other examples are also possible.

In another example, referring back to FIG. 6, if the skip forward control element 608 or the skip backward control element 604 is selected, the computing device may cause Playback Zone 1 to enter a second playback state that is playing a different media item than Song Title 1. In one case, causing Playback Zone 1 to enter the second playback state may involve the computing device sending a transmission to one or more devices in the media playback system indicating that Playback Zone 1 is to enter the second playback state of playing the different media item. In one instance, the one or more devices in the media playback system may include one or more playback devices in Playback Zone 1.

Figure 7C:
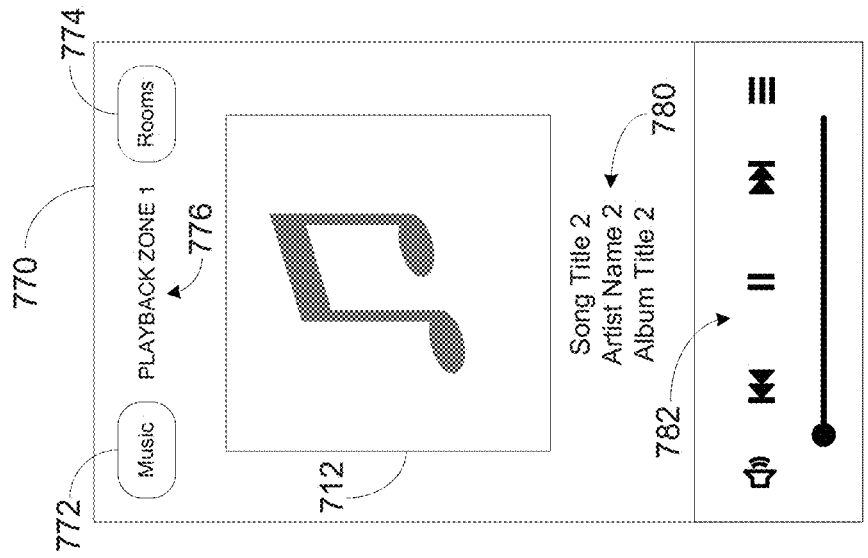
Figure 7B:
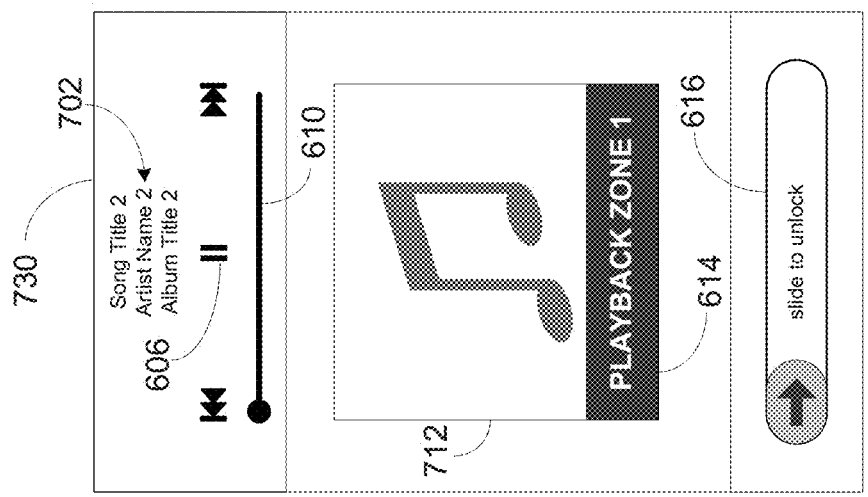

Upon Playback Zone 1 entering the second playback state of playing the different media item, the interface 600 may be updated to reflect the updated playback state of Playback Zone 1. FIG. 7B shows a second example computing device interface 730 that may be displayed in response to Playback Zone 1 entering the second playback state. As shown, interface 730 includes some similar control elements to that of interface 600, such as the skip backward control element 604, skip forward control element 606, the progress bar 610, as well as the pause control element 606, because the second playback state is a playback state of playing media content, albeit a different media item. The interface 730 may also include information indicating the different media item being played in Playback Zone 1. As shown, metadata 702 may identify the media item as "Song Title 2" by artists "Artist Name 2" from the album "Album Title 2." Album art 712 may be an album art for Album Title 2. The interface 730 may include the same playback zone indication 614 identifying Playback Zone 1 as the playback zone that the control elements and information displayed is associated with. Other examples are also possible. In both the interface 700 and 730, the control element 616 for unlocking the computing device may be displayed because the computing device is still in the locked state.

d. Unlocking the Computing Device

In one example, the computing device may receive a selection of the control element 616 shown in FIGS. 6, 7A, and 7B to unlock the computing device. In response to the selection of the control element 616 (and in some cases, providing additional credentials such as a passcode), the computing device may leave a locked state and enter an unlocked state.

Upon entering the unlocked state, the graphical display may automatically display a controller interface for the media playback system. In one case, the controller interface may be provided by a controller application for the media playback system. If the controller interface is already running on computing device, the computing device may display the controller interface upon entering the unlocked state. In another case, if the controller application was not already running, the computing device may launch the controller application and display the controller interface upon entering the unlocked state. As such, no additional selection of the controller application is required upon unlocking the computing device in order to access the controller interface.

Further, in one example, the controller interface may automatically provide information and control elements applicable to the playback zone as indicated in block 502. For instance, the indicated playback zone that was controllable via the at least one control element while the computing device was in the locked state may, in some cases, be a playback zone that is currently playing media content and/or a playback zone that the computing device is physically closest to (and not necessarily the playback zone that was last accessed). In one case, if the controller interface was last used to manage a Playback Zone 2, and the playback zone indicated in the graphical display while the computing device was in the locked state is Playback Zone 1, the controller interface may automatically provide information and control elements application to Playback Zone 1 upon unlocking the computing device, despite the controller interface being last used to manage Playback Zone 2. In other words, no additional navigation within the controller interface may be necessary to view information associated with the indicated playback zone and control the indicated playback zone, even if the controller interface was last used to manage a different playback zone As such, continuing with the example above in connection to FIG. 7B, if a selection of the control element 616 is received, and any relevant credential information is provided to the computing device and confirmed, a controller interface may be provided on the graphical display. FIG. 7C shows a third example computing device interface 770, which includes such an example controller interface for the media playback system.

As shown, the controller interface for the media playback system may include a "Music" icon 772 to view music sources, similar to that shown in the audio content sources region 450 of FIG. 4, a "Rooms" icon 774 to view different playback zones in the media playback system, similar to that shown in the audio content sources region 450 of FIG. 4, and a playback status region 648 similar to the playback status region 430 of FIG. 4. The controller interface may also include a playback control region 782 similar to the playback control region 440 of FIG. 4. The controller interface may also include a playback zone identifier 776 indicating that Playback Zone 1 is the playback zone for which information displayed in the playback status region 648 and control elements in the playback control region 782 are applicable. Further, metadata 780 identifying Song Title 2, Artist name 2, Album Title 2, and album art 712 may be displayed by the graphical display.

Selections of control elements provided on the controller interface shown in FIG. 7C may then be received. Based on the received selections, the computing device may transmit commands corresponding to the received selections to cause the playback zone to enter a third playback state. For instance, if a selection of a pause control element is received, the computing device may transmit a command to one or more playback devices in Playback Zone 1 to cause Playback Zone 1 to enter a paused state. Other examples are also possible.

e. Displaying the Indication of the Playback Zone and the at Least One Control Element on a Second Graphical Display In one example, referring back to block 502 of FIG. 5, the indication of the playback zone and the at least one control element that is displayed on the graphical display may also be displayed on a second graphical display. The computing device may also cause the playback state of the playback zone to be displayed on the second graphical display.

In one case, the second graphical display may be associated with a second media system that is separate from the media playback system discussed herein. For instance, the second media system may be a television, home theater, or home entertainment system that is not a part of the media playback system. As such, the second media system may be a system that is not configured to play media content in synchrony with playback zones in the media playback system.

Nevertheless, the second media system may be accessible by the computing device via a same local area network as the media playback system, and the computing device may cause, via the local area network, an indication of the playback zone, at least one control element, and a playback state of the playback zone to be displayed on the second graphical display.

In one example, the computing device may generate (i) a second media content comprising silent audio data and (ii) metadata associated with media content being played in the playback zone, and send the second media content and metadata associated with the media content played in the playback zone to the second media system to be played by the second media system. The second media system may accordingly display information indicating the playback state of the playback zone on the second graphical display, while playing the silent data in the second media content. By playing the silent data, synchrony between playback of media content by the media playback system and the second media system may not be necessary.

As suggested above, if the other media system is not configured to display an indication of the playback zone, the album art in the metadata associated with the media content played in the playback zone may be modified with an overlaid indication of the playback zone. The second media content, and the metadata associated with the media content played in the playback zone may be updated each time a playback state of the playback zone changes.

In one example, a controller device associated with the second media system may be used to control playback of media content in the playback zone, facilitated by further communication between the other media system and the computing device (or other one or more devices in the media playback system). For instance, the controller device associated with the second media system may interface with the controller application of the media playback system on the computing device via the second media system and the local area network, analogous to communication between the native interface of the computing device and the media playback system, as described previously. Other examples are also possible.

f. Additional Example Implementations

In addition to the examples discussed above, various other implementations and additional features for control of a media playback system from a lock screen of a computing device are also possible.

In one example, the computing device may detect when the computing device is within a proximity or within communicative range of the media playback system. For instance, if the computing device is a mobile device, the computing device may use cellular network information, or global positioning system information to determine when the computing device is within a proximity of a location of the media playback system. As such, the computing device, based on the determination that the computing device is within the proximity of the location, may display, while the computing device is in the locked state, an indication of a playback zone in the media playback system, and control elements for controlling playback of media content in the playback zone. In one example, the playback zone indicated may be a playback zone in the media playback system that the computing device last accessed. In another example, the playback zone indicated may be a predetermined, default playback zone that is indicated whenever the computing device first enters the proximity of the location of the media playback system. The default playback zone may be determined by a user of the media playback system, a user of the computing device, a playback device in the media playback system, or some other device associated with the media playback system.

In another example, additional functions may be available via the lock screen interface of the computing device. In one case, the playback zone indicated on the graphical display may be switched via a swipe touch input. For instance, if the playback zone indicated on the graphical display is Playback Zone 1, a swipe to the left or right, or up or down on the graphical display may cause the indicated playback zone to switch to Playback Zone 2. The at least one control element may accordingly correspond to Playback Zone 2 after the swipe. Other inputs aside from swipe inputs, such as shaking, tilting, or rotating of the computing device, may alternatively be used. As such, a user may easily and directly navigate to another playback zone in the media playback system to control the other playback zone while the computing device is in the locked state, without additional inputs.

As indicated above, the at least one control element may be based on a native lock screen control elements for the computing device. As such, the native lock screen control elements may be used, as described above, to control a playback zone in the media playback system. In some cases, the native lock screen control elements may also be used to control playback of media content by a built-in music player on the computing device, one or more other media systems, or one or more other media players. In some instances, more than one of the media playback system, built-in music player, one or more other media systems, and one or more other media players may be accessed via the computing device at a time. For instance, a user may be listening to media content on the computing device using the built-in music player, while within a proximity of the media playback system.

In such a case, an implementation may be provided such that the user may switch between using the native lock screen control elements to control the media playback system and using the native lock screen controls to control the built-in music player by swiping up and down, or left and right. Other inputs aside from swipe inputs, such as shaking, tilting, or rotating of the computing device, may alternatively be used. As such, the user may easily and directly navigate between controlling the media playback system and controlling the built-in music player while the computing device is in the locked state, without additional inputs. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve displaying on a graphical display of a computing device in a locked state, an indication of a playback zone and at least one control element that is selectable to control a playback state of the playback zone. In one aspect, a method is provided. The method involves, while (i) a computing device is in a locked state and (ii) a playback zone of a media playback system is in a first playback state, causing, by the computing device, a graphical display to display an indication of the playback zone and at least one control element. The at least one control element controls the playback state of the playback zone. The method further involves, while the computing device is in the locked state, receiving by the computing device a selection of one or more of the at least one control element, and while the computing device is in the locked state, based on the received selection, the computing device causing the playback zone to enter a second playback state.

In another aspect, a computing device is provided. The computing device includes a processor, and memory having stored thereon instructions executable by the processor to cause the computing device to perform functions. The functions include, while (i) the computing device is in a locked state and (ii) a playback zone of a media playback system is in a first playback state, causing a graphical display to display an indication of the playback zone and at least one control element. The at least one control element controls the playback state of the playback zone. The functions also include, while the computing device is in the locked state, receiving by the computing device a selection of one or more of the at least one control element, and while the computing device is in the locked state, based on the received selection, causing the playback zone to enter a second playback state.

In yet another aspect, a non-transitory computer readable memory is provided. The non-transitory computer readable memory has stored thereon instructions executable by a computing device to cause the computing device to perform functions. The functions include, while (i) a computing device is in a locked state and (ii) a playback zone of a media playback system is in a first playback state, causing a graphical display to display an indication of the playback zone and at least one control element. The at least one control element controls the playback state of the playback zone. The functions also include, while the computing device is in the locked state, receiving a selection of one or more of the at least one control element, and while the computing device is in the locked state, based on the received selection, causing the playback zone to enter a second playback state.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A computing device comprising:
one or more processors; and
tangible, computer readable medium having stored thereon instructions that, when executed by the one or more processors, cause the computing device to perform functions comprising:
entering a locked state;
while the computing device is in the locked state:
identifying, independent of user input, a given playback zone from among multiple playback zones of a media playback system;
causing a graphical display to display an indication of the given playback zone and at least one control element, wherein a particular control element of the at least one control element is selectable to cause the computing device to exit the locked state;
receiving input data indicating a selection of the particular control element;
based on receiving the input data indicating the selection of the particular control element, causing the computing device to exit the locked state; and
after exiting the locked state, causing the graphical display to display a controller interface for modifying a playback state of the given playback zone.

2. The computing device of claim 1, wherein the given playback zone is in a first playback state, wherein the particular control element is a first control element of the at least one control element, and wherein the functions further comprise:
while in the locked state:
before receiving the input data indicating the selection of the first control element, receiving input data indicating a selection of a second control element of the at least one control element, wherein the second control element is selectable to modify the playback state of the given playback zone;
based on receiving the input data indicating the selection of the second control element, causing the given playback zone to exit the first playback state and enter a second playback state; and
after causing the given playback zone to enter the second playback state, causing the graphical display to indicate that the given playback zone is in the second playback state.

3. The computing device of claim 1, wherein the given playback zone is a first playback zone, and wherein the functions further comprise:
while in the locked state and before identifying the given playback zone, causing the graphical display to display an indication of a second playback zone.

4. The computing device of claim 1, wherein the media playback system is in a first playback state, wherein the controller interface comprises at least one control element selectable to modify a playback state of the given playback zone, and wherein the functions further comprise:
after causing the graphical display to display the controller interface, receiving input data indicating a selection of the at least one control element of the controller interface; and
based on receiving the input data indicating the selection of the at least one control element of the controller interface, causing the given playback zone to exit the first playback state and enter a second playback state.

5. The computing device of claim 1, wherein the controller interface comprises one or more of: (a) a graphical representation of the given playback zone, (b) a graphical representation of media content associated with the given playback zone, (c) a graphical representation selectable to switch to an interface for modifying a different playback zone in the media playback system, and (d) a graphical representation for modifying the media content associated with the given playback zone.

6. The computing device of claim 1, wherein the graphical display is a touch screen interface of the computing device, and wherein receiving the input data comprises:
 receiving the input data via the touch screen interface.

7. The computing device of claim 1, wherein identifying, independent of user input, the given playback zone from among multiple playback zones of the media playback system comprises:
 determining a wireless communication signal strength between the computing device and at least one playback device corresponding to the given playback zone; and
 identifying the playback zone from among multiple playback zones based on the determined wireless communication signal strength.

8. The computing device of claim 1, wherein identifying, independent of user input, the given playback zone from among multiple playback zones of the media playback system comprises:
 receiving from at least one playback device corresponding to the given playback zone, data indicating that the given playback zone is currently playing media content; and
 identifying the playback zone from among multiple playback zones based on the data indicating that the given playback zone is currently playing media content.

9. Tangible, non-transitory, computer-readable media having stored thereon instructions that, when executed by one or more processors of a computing device, cause the computing device to perform functions comprising:
 entering a locked state;
 while the computing device is in the locked state:
  identifying, independent of user input, a given playback zone from among multiple playback zones of a media playback system;
  causing a graphical display to display an indication of the given playback zone and at least one control element, wherein a particular control element of the at least one control element is selectable to cause the computing device to exit the locked state;
  receiving input data indicating a selection of the particular control element;
  based on receiving the input data indicating the selection of the particular control element, causing the computing device to exit the locked state; and
 after exiting the locked state, causing the graphical display to display a controller interface for modifying a playback state of the given playback zone.

10. The tangible, non-transitory, computer-readable media of claim 9, wherein the given playback zone is in a first playback state, wherein the particular control element is a first control element of the at least one control element, and wherein the functions further comprise:
 while in the locked state:
  before receiving the input data indicating the selection of the first control element, receiving input data indicating a selection of a second control element of the at least one control element, wherein the second control element is selectable to modify the playback state of the given playback zone;
  based on receiving the input data indicating the selection of the second control element, causing the given playback zone to exit the first playback state and enter a second playback state; and
  after causing the given playback zone to enter the second playback state, causing the graphical display to indicate that the given playback zone is in the second playback state.

11. The tangible, non-transitory, computer-readable media of claim 9, wherein the given playback zone is a first playback zone, and wherein the functions further comprise:
 while in the locked state and before identifying the given playback zone, causing the graphical display to display an indication of a second playback zone.

12. The tangible, non-transitory, computer-readable media of claim 9, wherein the media playback system is in a first playback state, wherein the controller interface comprises at least one control element selectable to modify a playback state of the given playback zone, and wherein the functions further comprise:
 after causing the graphical display to display the controller interface, receiving input data indicating a selection of the at least one control element of the controller interface; and
 based on receiving the input data indicating the selection of the at least one control element of the controller interface, causing the given playback zone to exit the first playback state and enter a second playback state.

13. The tangible, non-transitory, computer-readable media of claim 9, wherein the controller interface comprises one or more of: (a) a graphical representation of the given playback zone, (b) a graphical representation of media content associated with the given playback zone, (c) a graphical representation selectable to switch to an interface for modifying a different playback zone in the media playback system, and (d) a graphical representation for modifying the media content associated with the given playback zone.

14. The tangible, non-transitory, computer-readable media of claim 9, wherein the graphical display is a touch screen interface of the computing device, and wherein receiving the input data comprises:
 receiving the input data via the touch screen interface.

15. The tangible, non-transitory, computer-readable media of claim 9, wherein identifying, independent of user input, the given playback zone from among multiple playback zones of the media playback system comprises:
 determining a wireless communication signal strength between the computing device and at least one playback device corresponding to the given playback zone; and
 identifying the playback zone from among multiple playback zones based on the determined wireless communication signal strength.

16. The tangible, non-transitory, computer-readable media of claim 9, wherein identifying, independent of user input, the given playback zone from among multiple playback zones of the media playback system comprises:
 receiving from at least one playback device corresponding to the given playback zone, data indicating that the given playback zone is currently playing media content; and
 identifying the playback zone from among multiple playback zones based on the data indicating that the given playback zone is currently playing media content.

17. A method comprising:
 entering by a computing device, a locked state;
 while the computing device is in the locked state:
  identifying, independent of user input, a given playback zone from among multiple playback zones of a media playback system;

causing a graphical display to display an indication of the given playback zone and at least one control element, wherein a particular control element of the at least one control element is selectable to cause the computing device to exit the locked state;

receiving input data indicating a selection of the particular control element;

based on receiving the input data indicating the selection of the particular control element, causing the computing device to exit the locked state; and after exiting the locked state, causing the graphical display to display a controller interface for modifying a playback state of the given playback zone.

18. The method of claim 17, wherein the given playback zone is in a first playback state, wherein the particular control element is a first control element of the at least one control element, and wherein the method further comprises:

while the computing device is in the locked state:

before receiving the input data indicating the selection of the first control element, receiving input data indicating a selection of a second control element of the at least one control element, wherein the second control element is selectable to modify the playback state of the given playback zone;

based on receiving the input data indicating the selection of the second control element, causing the given playback zone to exit the first playback state and enter a second playback state; and after causing the given playback zone to enter the second playback state, causing the graphical display to indicate that the given playback zone is in the second playback state.

19. The method of claim 17, wherein the media playback system is in a first playback state, wherein the controller interface comprises at least one control element selectable to modify a playback state of the given playback zone, and wherein the method further comprises:

after causing the graphical display to display the controller interface, receiving input data indicating a selection of the at least one control element of the controller interface; and based on receiving the input data indicating the selection of the at least one control element of the controller interface, causing the given playback zone to exit the first playback state and enter a second playback state.

20. The method of claim 17, wherein identifying, independent of user input, the given playback zone from among multiple playback zones of the media playback system comprises:

determining a wireless communication signal strength between the computing device and at least one playback device corresponding to the given playback zone; and identifying the playback zone from among multiple playback zones based on the determined wireless communication signal strength.

* * * * *